US006973993B2

(12) United States Patent
West et al.

(10) Patent No.: US 6,973,993 B2
(45) Date of Patent: Dec. 13, 2005

(54) METHODS AND APPARATUS OF SUPPRESSING TUBE WAVES WITHIN A BORE HOLE AND SEISMIC SURVEYING SYSTEMS INCORPORATING SAME

(75) Inventors: Phillip B. West, Idaho Falls, ID (US); Daryl Haefner, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 51 days.

(21) Appl. No.: 10/881,529

(22) Filed: Jun. 29, 2004

(65) Prior Publication Data

US 2004/0238266 A1 Dec. 2, 2004

Related U.S. Application Data

(62) Division of application No. 10/300,277, filed on Nov. 19, 2002, now Pat. No. 6,776,255.

(51) Int. Cl.[7] ................................................ G01V 1/40

(52) U.S. Cl. ...................... 181/102; 181/105; 181/119; 367/25; 367/86

(58) Field of Search ......................... 181/0.5, 105, 106, 181/110, 119, 120, 122, 101, 102; 367/25, 144, 146, 162, 911, 912, 131, 141; 166/254.2, 401

(56) References Cited

U.S. PATENT DOCUMENTS 3,601,216 A 8/1971 Mott-Smith
3,982,606 A 9/1976 Berry et al.
4,497,388 A 2/1985 Dexter
4,611,685 A 9/1986 Curran
4,671,379 A 6/1987 Kennedy et al.
4,722,417 A 2/1988 Selsam
4,858,718 A 8/1989 Chelminski
5,005,666 A 4/1991 Fairborn
5,170,018 A 12/1992 Potier
5,171,943 A 12/1992 Balogh et al.
5,185,503 A 2/1993 Fortin
5,229,977 A 7/1993 Owen
5,370,188 A * 12/1994 Cottrell ...................... 166/369
6,089,345 A 7/2000 Meynier et al.
6,196,350 B1 3/2001 Minto
6,643,221 B1 * 11/2003 Hsu et al. ................... 181/102
2004/0152601 A1 * 8/2004 Still et al. ................... 507/100

* cited by examiner

*Primary Examiner*—David Martin
*Assistant Examiner*—Eduardo Colon Santana
(74) *Attorney, Agent, or Firm*—Trask Britt, P.C.

(57) ABSTRACT

Methods and apparatus for attenuating waves in a bore hole, and seismic surveying systems incorporating the same. In one embodiment, an attenuating device includes a soft compliant bladder coupled to a pressurized gas source. A pressure regulating system reduces the pressure of the gas from the gas source prior to entering the bladder and operates in conjunction with the hydrostatic pressure of the fluid in a bore hole to maintain the pressure of the bladder at a specified pressure relative to the surrounding bore hole pressure. Once the hydrostatic pressure of the bore hole fluid exceeds that of the gas source, bore hole fluid may be admitted into a vessel of the gas source to further compress and displace the gas contained therein. In another embodiment, a water-reactive material may be used to provide gas to the bladder wherein the amount of gas generated by the water-reactive material may depend on the hydrostatic pressure of the bore hole fluid.

18 Claims, 6 Drawing Sheets

METHODS AND APPARATUS OF SUPPRESSING TUBE WAVES WITHIN A BORE HOLE AND SEISMIC SURVEYING SYSTEMS INCORPORATING SAME

REALTED APPLICATIONS

This application is a divisional of U.S. patent application Ser. No. 10/300,277 filed on Nov. 19, 2002, now U.S. Pat. No. 6,776,255.

GOVERNMENT RIGHTS

The United States Government has certain rights in this invention pursuant to Contract No. DE-AC07-99ID 13727, and Contract No. DE-AC07-051D14517 between the United States Department of Energy and Battelle Energy Alliance, LLC.

BACKGROUND OF THE INVENTION

1. Field of the Invention

The present invention relates generally to the suppression of tube waves within a bore hole and, more particularly, to an apparatus and method for suppressing or attenuating tube waves within a bore hole at increased depths and/or pressures including automatically adjusting internal pressure of a wave suppressing apparatus responsive to local bore hole pressure.

2. State of the Art

Seismic surveys are conducted in various ways, including surface and subsurface techniques. Surface seismic techniques generally include placing both a seismic energy source, such as an air gun, explosive source or impact-type, vibrational seismic device, and one or more seismic energy detectors, such as, for example, geophones, at the surface of the earth above a subterranean formation, the characteristics of which are to be obtained. The seismic energy source induces wave energy into the formation. The response of the wave energy, as it is reflected/transmitted back to the surface, is detected and recorded by the seismic detectors, also termed receivers. The response of the wave energy is analyzed so that the characteristics of the subterranean formation may be determined and mapped.

In subsurface processes, various methods are used. For example, in vertical seismic profiling (VSP) the seismic energy source remains at the surface while the seismic detectors are located within a bore hole, which may also be referred to herein as a bore hole, formed in the subterranean formation of interest. In inverse VSP processes the seismic energy source is located within the bore hole while the seismic detectors are located at the surface.

Another subsurface process, known as cross-well seismic profiling, includes positioning the seismic energy source in a first borehole and then positioning seismic detectors in one or more laterally adjacent boreholes formed in the general proximity of the subterranean formation of interest. VSP, inverse VSP and cross-well seismic profiling have been generally noted as providing greater resolution than surface techniques as such processes are able to make use of direct and/or refracted wave fields traveling through the various subterranean strata rather than reflected wave fields only.

Yet another subsurface process which has more recently been under development may be referred to as single well seismic profiling. Single well seismic profiling includes disposing both the seismic energy source and the seismic detectors within the same bore hole. Thus, single well seismic profiling inherently deals with reflective wave fields, but allows a closer look at the surrounding formation as the seismic energy source and detectors may be disposed at various elevations within the bore hole to map the formation at greater depths than is possible using surface profiling. Additionally, single well seismic profiling may be considerably less expensive and time consuming than cross-well seismic profiling as only a single bore hole must be drilled. Further, in some formations which are of interest, potential suitable locations for multiple bore holes may be limited, thereby eliminating the possibility of using cross-well seismic profiling.

One difficulty encountered when using subsurface profiling techniques, in either cross-well or single well seismic profiling, is the generation of tube waves, sometimes referred to as Stoneley waves. Tube waves are basically the result of wave energy transmitted to the bore hole fluid via the surrounding formation or directly from a source in the same well. Tube waves propagate up and down the bore hole through fluid contained therein with the bore hole wall or casing acting as a wave guide. Tube waves typically travel through the bore hole with little or no attenuation, the wave energy being substantially reflected at the upper and lower ends of the borehole or at any other discontinuity within the bore hole. Such waves interfere with the primary wave fields being detected and analyzed, potentially compromising the survey being performed and, at the very least, complicating the process of analyzing the wave energy which is detected.

Suppression or attenuation of tube waves significantly enhances the signal-to-noise ratios attainable in bore hole environments thereby reducing the interference or masking effect of tube waves with respect to the seismic wave signals of interest. Thus, various techniques have been implemented, with varying degrees of success, in an effort to suppress tube waves. For example, plugs or packers have been strategically placed within the bore hole in an attempt to reduce or eliminate the amplitude of the tube wave and specified locations. However, such plugs and packers are of limited effect as they require secure clamping to the bore hole wall or casing thereby introducing mechanical complexities as well as providing a path for wave energy to be transferred to the bore hole wall or casing, resulting in a possible secondary wave source.

Another method of suppressing tube waves includes positioning a gas filled bladder within the bore hole. The bladder acts to absorb and attenuate wave energy as the tube wave propagates thereby. For example, U.S. Pat. No. 4,858,718 to Chelminski provides an apparatus which includes a gas filled bladder coupled with a gas source. The gas source may be located at the surface of the bore hole, or alternatively, may include a precharged vessel which is disposed within the bore hole along with the bladder. Gas is supplied to the bladder via a pressure reducing valve so as to maintain a pressure within the bladder which is greater than the pressure of the surrounding fluid as the bladder descends to greater depths within the bore hole. However, in order to go to significant depths, the attenuation device of Chelminksi must either be supplied with pressure from the surface, meaning that high pressure tubing must be run down the bore hole with the attenuation device, or must incorporate a pressure vessel rated to withstand extreme pressures and provide high pressure gas for deployment in the bore hole. Use of such a pressure vessel significantly increases the cost of such an attenuation device, increases the size, weight and complexity thereof, and also introduces the potential for danger to personnel and equipment at the surface through the use of extreme pressurization equipment.

In view of the shortcomings in the state of the art, it would be advantageous to provide an apparatus and method for the attenuation of tube waves at increased depth which is autonomous (e.g., does not require input or control from the surface) while also minimizing the size and rating of any pressure vessel required for use therewith.

BRIEF SUMMARY OF THE INVENTION

In accordance with one aspect of the invention, an apparatus for attenuating tube waves within a bore hole is provided. The apparatus includes a bladder formed of a soft, compliant material, a pressure vessel configured to store a volume of pressurized gas therein and a pressure regulating system operatively coupled between the bladder and the pressure vessel. The pressure regulating system is configured to admit gas from the pressure vessel into the bladder at a reduced pressure in response to a change in a hydrostatic pressure of a fluid within the bore hole. The regulating system is further configured to maintain the bladder at a substantially constant pressure relative to the hydrostatic pressure of fluid in the bore hole proximate the apparatus. The apparatus further includes a first valve operatively coupled with the pressure vessel configured to admit an amount of the fluid within the bore hole into the pressure vessel when the hydrostatic pressure of the surrounding volume of fluid within the bore hole is greater than a pressure of the volume of pressurized gas within the pressure vessel.

In accordance with another aspect of the present invention, a method is provided for attenuating tube waves within a bore hole containing a volume of fluid therein. The method includes disposing a bladder within the volume of fluid. A pressure vessel is coupled with the bladder and volume of pressurized gas is provided within the pressure vessel. The bladder is maintained at a substantially constant volume by delivering a portion of the volume of gas from the pressure vessel to the bladder at a reduced pressure in response to a change in hydrostatic pressure of the volume of fluid in the bore hole. The pressure within the bladder is balanced with the pressure within the pressure vessel and an amount of fluid is admitted from the volume of fluid in the bore hole into the pressure vessel to compress the remaining volume of gas contained within the pressure vessel.

In accordance with yet another aspect of the invention, another apparatus for attenuating tube waves within a bore hole is provided. The apparatus includes a bladder formed of a soft, compliant material and a chamber having an upper end and lower end. The upper end of the chamber is in fluid communication with the bladder, the lower end of the chamber has least one opening therein providing fluid communication between an interior portion of the chamber and a volume of fluid contained within a bore hole. A volume of water-reactive material is stored within the chamber wherein the chamber is configured to admit a portion of the volume of bore hole fluid into the chamber through the at least one opening to react with the water-reactive material and generate a volume of gas therefrom.

In accordance with a further aspect of the invention, another method is provided for attenuating tube waves within a bore hole containing a volume of fluid therein. The method includes disposing a bladder within the volume of fluid and coupling a chamber with the bladder such that an upper end of the chamber is, in fluid communication with the bladder. A volume of water-reactive material is disposed within the chamber and a portion of the volume of fluid is permitted to enter the chamber. The portion of the volume of fluid is reacted with a portion of the volume of the water-reactive material to generate a volume of gas and at least a portion of the volume of gas is delivered to the bladder.

In accordance with yet another aspect of the invention, seismic surveying systems are provided including at least one seismic energy source configured to induce seismic waves in the subterranean formation, a bore hole formed within the subterranean formation and at least one sensing apparatus deployed within the bore hole. Additionally, the seismic surveying systems include at least one apparatus for attenuating tube waves within the bore hole such as the attenuating apparatus of the present invention as described above and below herein.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
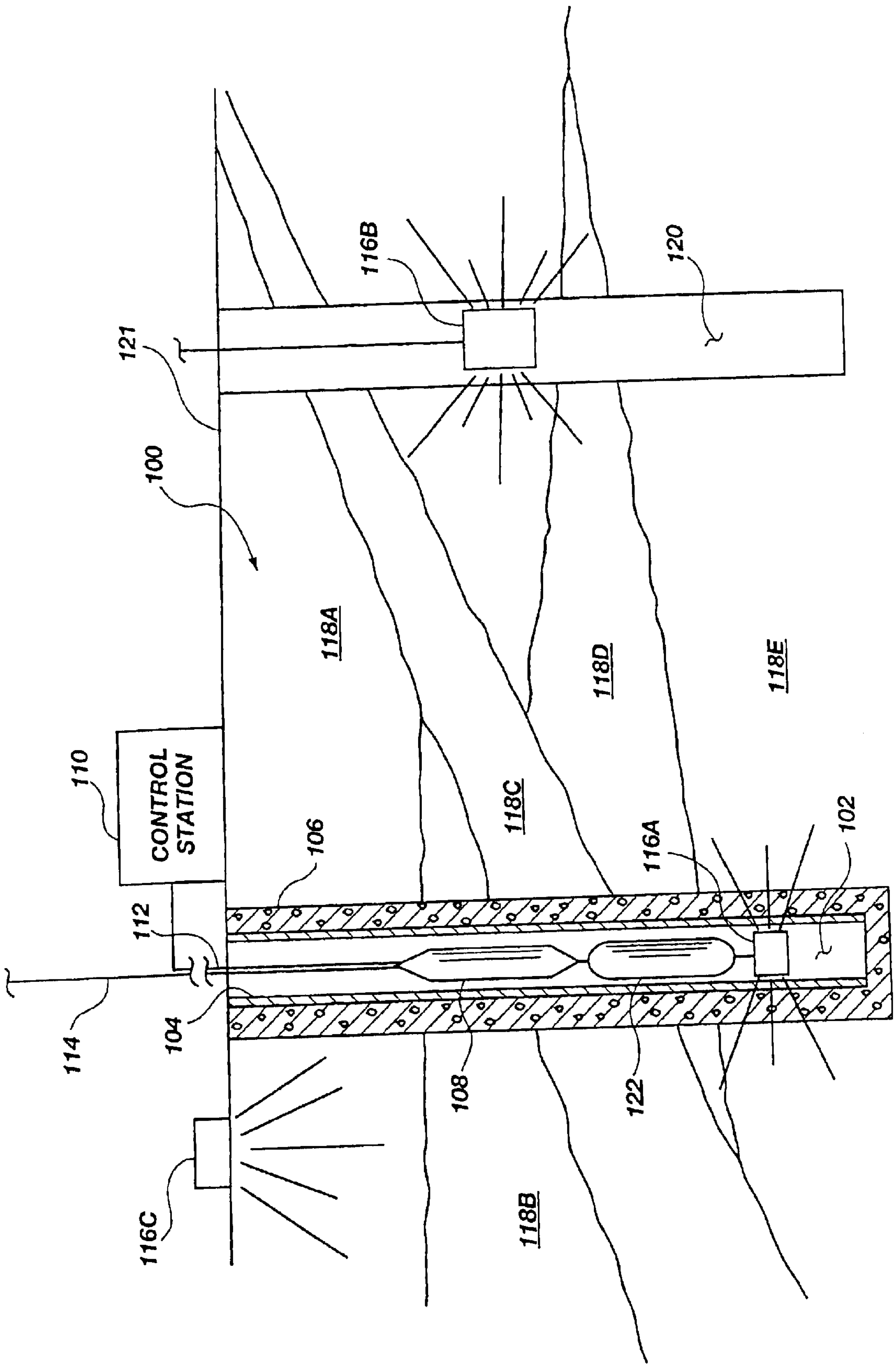
FIG. 1 shows a seismic surveying system according to an embodiment of the present invention.

Referring to FIG. 1, a subterranean formation 100 is generally depicted having a first well bore or bore hole 102 formed therein. The first bore hole 102 may include a casing 104 or lining which may be fixed within the subterranean formation 100, for example, by cementing within an annulus 106 formed thereabout between the casing exterior and bore hole wall as known to those of ordinary skill in the art.

At least one sensing apparatus 108, such as, for example, geophones and/or hydrophones, may be deployed within the bore hole 102 at a specified elevation for detecting and recording seismic waves transmitted through the subterranean formation 100, through the cement in the annulus 106 to the casing 104 and into a fluid contained within the bore hole 102. It is noted that, while only a single sensing apparatus 108 is shown, others may also be deployed at different elevations within the bore hole 102 in conjunction with surveying the subterranean formation 100.

The sensing apparatus 108, may be coupled with a control station 110 at the surface through an appropriate transmission line 112 such as, for example, a seven conductor wireline known to those of ordinary skill in the art. The control station 110 may include, for example, a power supply to provide power to the sensing apparatus 108 and a computer for collecting and recording signals produced by the sensing apparatus 108. The transmission line 112 may also run adjacent to, or otherwise be incorporated with, a cable 114, tubing string or other elongated structural member used to support the deployed sensing apparatus 108, as well as other downhole components, at a specified depth within the bore hole 102.

The sensing apparatus 108 is configured to detect seismic waves transmitted through the subterranean formation 100 and to produce an electrical signal representative thereof. The seismic waves may be produced by any of a number of seismic energy sources known in the art including, for example, vibrational, explosive or acoustic energy sources. Additionally, the seismic energy source may be positioned in various locations relative to the bore hole 102 and the sensing apparatus 108. For example, a seismic energy source 116A may be placed within the same bore hole 102 as the sensing apparatus 108 itself for single well seismic surveying. In such a case, seismic waves are emitted from the seismic energy source 116A and reflected back from various subformations or strata 118A–118E, or changes in composition, within the subterranean formation 100.

In another example, a seismic energy source 116B may be placed in a second bore hole, known as the source well 120, located a known distance from the first bore hole 102. The seismic energy source 116B induces seismic waves in the subterranean formation 100, which may be reflected or refracted by the subformations or strata 118A–118E and detected by the sensing apparatus 108. While only a single source well 120 is shown in FIG. 1, it is noted that multiple source wells might be used wherein the individual source wells are located at different distances and/or relative azimuth orientations with respect to the bore hole having the sensing apparatus deployed therein.

In yet another example, one or more seismic energy sources 116C may be located at the terrestrial surface 121 over the subterranean formation 100. Again, the seismic energy source 116C projects seismic energy into the subterranean formation 100, which seismic energy may be reflected or refracted by the subformations or strata 118A–118E, and is detected by the sensing apparatus 108.

A wave attenuator 122 or suppressor, in accordance with the present invention, is also deployed within the bore hole 102 for suppression of tube waves which propagate longitudinally within a fluid medium contained within the bore hole 102. As discussed in greater detail above, such tube waves, unless suppressed, tend interfere with the sensing of the seismic waves by the sensing apparatus 108, potentially causing incomplete and/or incorrect data to be collected regarding the subterranean formation 100.

Figure 2:
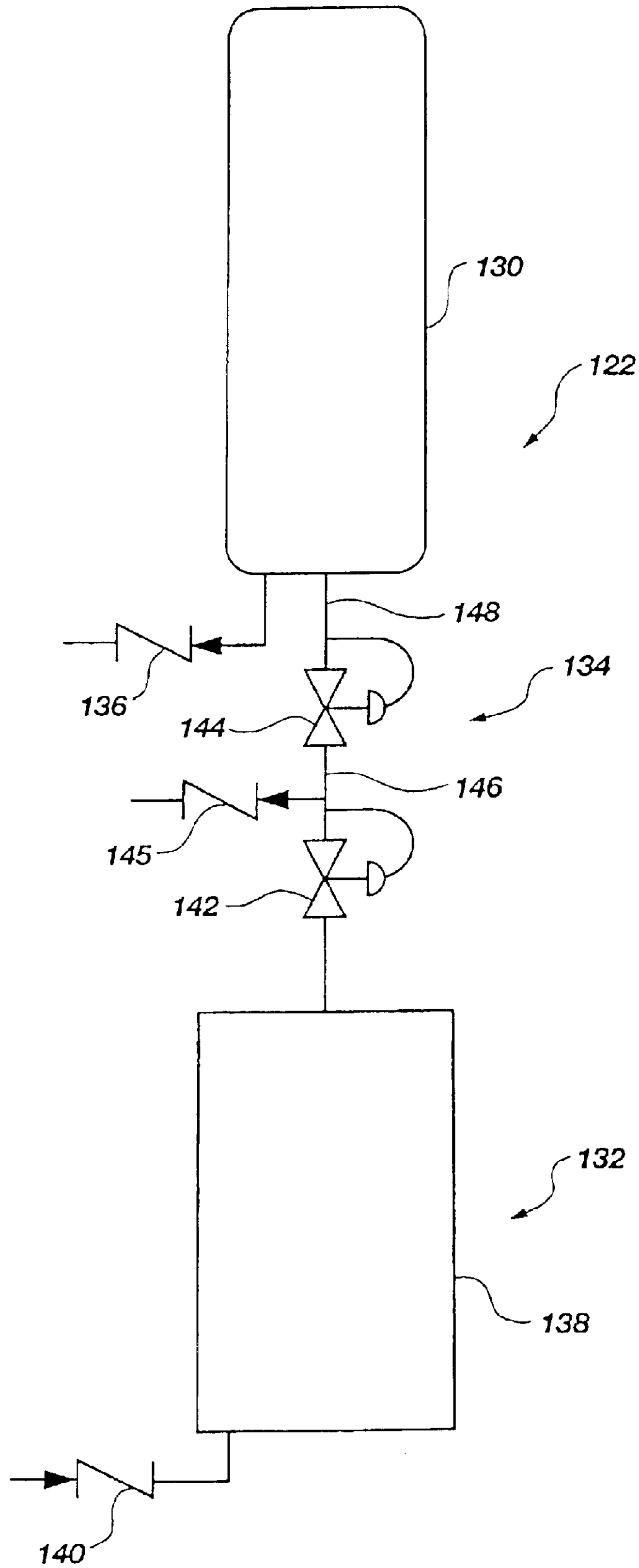
FIG. 2 is a schematic depicting an attenuating device according to an embodiment of the present invention.

Referring now to FIG. 2 in conjunction with FIG. 1, a schematic of a wave attenuation device 122, also referred to herein simply as an attenuator, is shown in accordance with one embodiment of the present invention. The wave attenuator 122 includes a bladder 130 coupled to a pressure supply system 132 via a pressure regulating system 134.

The bladder 130 is desirably formed of a soft, compliant material such as, for example, a vinyl material and is configured to absorb wave energy as a tube wave traverses by the attenuator 122. A check valve 136, or a pressure relief valve, may be coupled with the bladder 130, the operation and function of which will be described below herein.

The pressure supply system 132 includes a pressure vessel 138 rated to withstand a predetermined pressure. For example, in one embodiment, the pressure vessel 138 may be rated to contain a volume of gas at a pressure of approximately 2,000 pounds per square inch (psi). The pressure vessel 138 may be filled or precharged with a compressed gas such as, for example, air or nitrogen, although it could be essentially any gas that behaves as an ideal gas at specified depths within the bore hole 102. The pressure supply system 132 also includes a check valve 140 coupled with the pressure vessel 138, the operation and function of which will be described below herein.

The pressure regulating system 134 may be configured as a multi-stage system. Thus, for example, the embodiment of pressure regulating system 134 shown in FIG. 2 is configured as a two-stage regulating system including a first pressure regulator 142 and a second pressure regulator 144 coupled in series between the pressure supply system 132 and the bladder 130. A dump valve 145 may also be coupled between the two regulators 142 and 144. In certain embodiments, the dump valve 145, such as a pressure relief valve, may operate to release excessive pressure between the regulators 142 and 144 (e.g., such as during an ascent of the apparatus through the bore hole 102) which might otherwise cause damage to the regulators 142 and 144.

In operation, the attenuator 122 is placed within a bore hole 102 and submerged in a fluid contained therein. As noted above, the pressure vessel 138 is precharged to a desired pressure with a compressed gas. The pressure regulating system 134 is configured to deliver gas from the pressure vessel 138 to the bladder in response to the hydrostatic pressure of a fluid in the bore hole 102 as the attenuator 122 descends therethrough. The pressure regulating system 134 operates in a manner substantially similar to a SCUBA (self contained underwater breathing apparatus) regulating system, wherein the first regulator 142 reduces the gas pressure from that which is in the pressure vessel 138 to an intermediate gas pressure within the tubing 146 or conduit located between the two regulators 142 and 144. The second pressure regulator 144 then reduces the gas from that of the intermediate gas pressure to a further reduced pressure within the bladder 130 and the tubing 148 or conduit coupled between the bladder 130 and the second pressure regulator 144. This reduced pressure is substantially the same as, or slightly above (e.g., 0.33 psi), the hydrostatic pressure of the fluid in the bore hole 102 proximate the attenuator 122.

The regulators, or regulating valves 142 and 144 each include a member which is in communication with the bore hole fluid and is, at least partially, responsive to the hydrostatic pressure of the bore hole fluid. Thus, for example, referring to FIG. 3, an exemplary embodiment of the first regulating valve 142 may include a housing 160 having inlet 162 to receive gas from the pressure vessel 138 (FIG. 2). A stopping member 164, such as a valve stem, forms a seal at aperture 165 between the inlet 162 and a chamber 166. An outlet 168 associated with the chamber 166 may be connected with the second regulating valve 142 through tubing 146 (FIG. 2). An actuating member 170 such as, for example, a diaphragm, is exposed to the bore hole fluid such as through openings 172 formed in the housing 160. The actuating member 170 is responsive to the hydrostatic pressure of the bore hole fluid and is operatively coupled with the stopping member 164. The inlet 162 is at the pressure of the pressure vessel 138 (FIG. 2), and the chamber 166 is at the reduced intermediate pressure as described above herein. When the hydrostatic pressure of the bore hole fluid is above the intermediate pressure of that which is in the chamber 166 and, in the case where a biasing member 174 (shown by way of example only as a coil spring) is used in conjunction with the stopping member 164, also sufficient to overcome the additional force of the biasing member 174, the actuating member 170 causes the stopping member 164 to be displaced thereby allowing gas to flow from the pressure vessel 138 (FIG. 2) through the inlet 162, aperture 165 and into the chamber 166. The delivery of gas to the chamber 166 causes an increase in the gas pressure within the chamber 166 until the pressure within the chamber 166 is sufficient to cause the actuating member 170 to retract.

Figure 3:
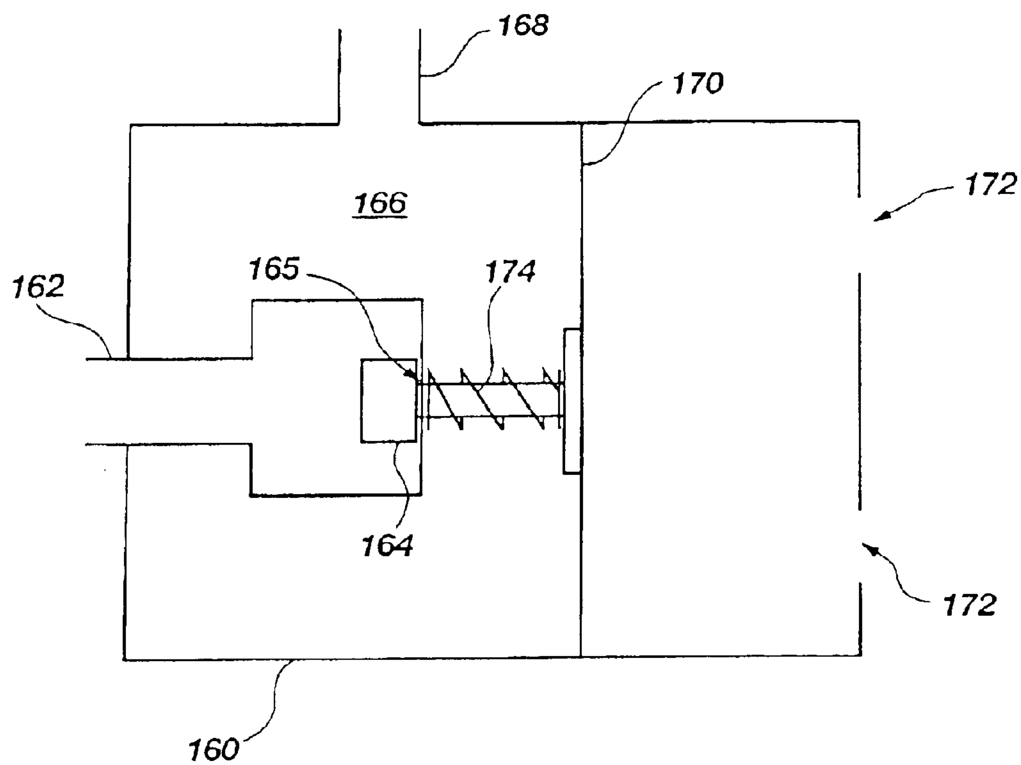
FIG. 3 is a partial sectional schematic view of an exemplary valve which may be used with the attenuating device of the present invention.

The second regulating valve 144 may operate in a substantially similar manner except that the inlet 162, as shown in FIG. 3, would be coupled through tubing 146 with the first regulating valve 142 (FIG. 2) at the intermediate pressure, while the outlet 168 would be coupled with the bladder 130 through tubing 148 (FIG. 2) at the reduced pressure which is substantially equal to the local hydrostatic pressure of the bore hole fluid. The use of a multi-stage regulating system incorporating valves similar to those described herein enables enhanced precision of control of the pressure within the bladder 130 (FIG. 2) to provide more efficient attenuation of tube waves. It is generally desirable that the valves 142 and 144, or other member of the pressure regulating system 134, be sensitive enough to maintain the pressure of the bladder 130 within a desired range such as, for example, between approximately 0 and 1.0 psi relative to the immediately surrounding bore hole fluid. It may also be desirable to configure the valves 142 and 144, or other member of the pressure regulating system 134, as fail open valves as will be appreciated by those of ordinary skill in the art.

It is noted, that the valve described with respect to FIG. 3 is exemplary and that other configurations are contemplated as being within the scope of the present invention. For example, the actuating member 170 may be configured as a piston which is sealingly slidable within the chamber 166 such that, upon subjection to an appropriate pressure differential, it displaces within the chamber 166 causing the stopping member 164 to break from its seal. Furthermore, in other embodiments, the pressure regulating system might be replaced with a check valve which maintains a desired pressure relationship between the bladder 130 and the pressure vessel 138.

Referring back to FIGS. 1 and 2, as the attenuator 122 is caused to descend within the bore hole 102, the hydrostatic pressure of the bore hole fluid increases. Increases in hydrostatic pressure of the bore hole fluid as attenuator 122 descends cause the pressure regulating system 134 to deliver controlled volumes of gas from the pressure vessel 138 to the bladder 130 thereby maintaining the bladder 130 at a substantially constant volume. Further, the initial pressure of the precharged pressure vessel 138 allows the attenuator to descend to a certain depth depending on factors such as the volume of bladder 130, the volume of the pressure vessel 138 and the specific weight of the bore hole fluid. Thus, at a predetermined depth, the pressure in the bladder is substantially balanced with that of the pressure vessel.

Upon reaching a depth wherein pressures in bladder 130 and the pressure vessel 138 (as well as with local hydrostatic pressure of the bore hole fluid) are substantially balanced, pressure regulating system 134, including, for example, the regulating valves 142 and 144, default to an open position. As the attenuator continues to descend further within the bore hole 102, the hydrostatic pressure continues to increase above the gas pressure exhibited within the pressure vessel 138. Due to this pressure differential, the check valve 140 associated with the pressure supply system 132 allows bore hole fluid to enter into the pressure vessel thereby compressing the gas which is contained therein. This compression of gas causes an additional volume of gas to be delivered to the bladder 130 thereby maintaining the pressure within the bladder 130 at an appropriate level, substantially balanced with that of the surrounding borehole fluid. It is noted that, in one embodiment, the pressure vessel 138 may exhibit a volume which is approximately three to four times the volume of the bladder 130, enabling a substantial amount of gas to be compressed and displaced by the bore hole fluid. Thus, after the attenuator 122 has reached the depth at which the precharged volume of gas has become exhausted such that the system is substantially pressure balanced, the attenuator 122 may continue to descend a considerable distance without losing its effectiveness by utilizing the bore hole fluid to further compress the gas contained within the attenuator 122.

Furthermore, in some circumstances, as the attenuator 122 continues to descend within the bore hole 102, compression of the gas within the pressure vessel 138 may cause complete displacement of the gas such that the pressure vessel 138 is completely filled with bore hole fluid. Upon even further descent, the bore hole fluid may even pass into the bladder 130 which, while reducing the effective volume of the bladder 130, may enable attenuation at additional depths although the attenuation may be also be somewhat reduced due to the reduction the bladder's effective volume. In another embodiment, where it may undesirable to let bore hole fluid into the pressure vessel 138, a flexible self-contained fluid supply, such as a fresh water fluid supply, may be connected with the check valve 40 to effect further compression of the gas within the pressure vessel 138.

Figure 4B:
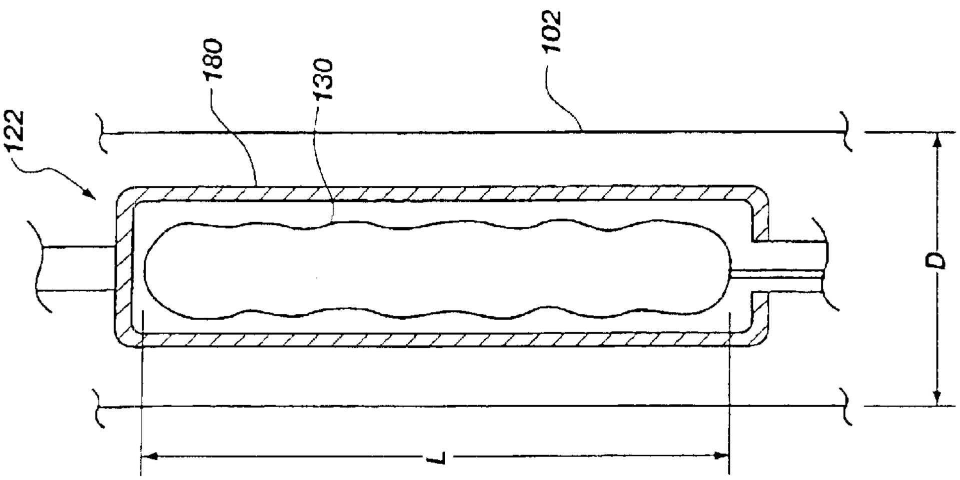
FIGS. 4A and 4B show an elevational view and a partial cross-sectional view of a portion of an attenuating device according to an embodiment of the present invention.
Figure 4A:
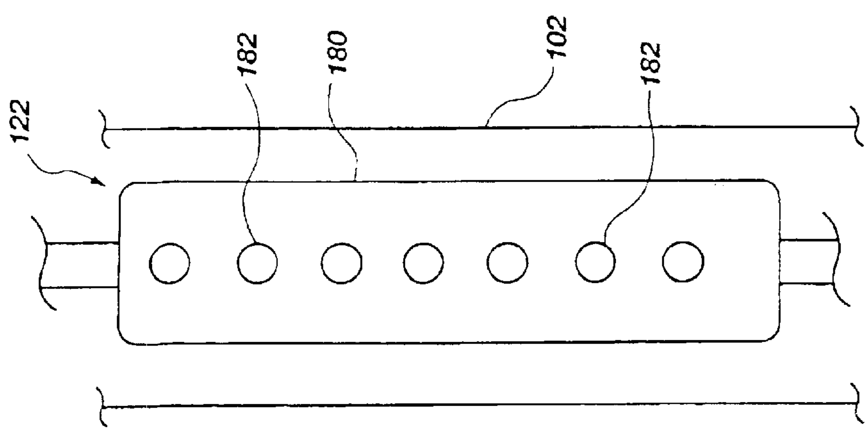

Referring now to FIGS. 4A and 4B, a portion of the attenuator 122 is shown in elevational and partial cross sectional views respectively. The bladder 130 of the attenuator 122 may be substantially enclosed or concealed within a housing member 180, which serves as a baffle. The housing member 180 includes a plurality of openings 182 which act as orifices allowing the bore hole fluid to become displaced therethrough as a tube wave is transmitted through the bore hole fluid. As displaced bore hole fluid passes through the openings 182, energy is dissipated by way of associated viscous losses. However, it is desirable that the orifices not be overly restrictive; otherwise, the tube wave will not pass energy beyond the housing member 180 and to the bladder 130. On the other hand, if the openings are not properly restrictive, reflection of the tube wave off of the bladder 130 may occur. Thus, it is desirable to substantially match the impedance of the tube wave with the openings 182 of the housing 180. This may be done by sizing the openings 182 such that the cumulative area represented by the openings 182 is substantially the same as the cross-sectional area of the bore hole 102, taken in a plane substantially perpendicular to the longitudinal axis of the bore hole 102. By matching the cumulative area of the openings 182 with the cross-sectional area of the bore hole 102, energy-momentum functions may be conserved.

Additionally, it may be desirable to approximate the natural frequency of the tube wave to that of the attenuator 122. This can be accomplished by modeling the attenuator 122 using a simple mass-spring equation while substantially ignoring any associated damping frequency. In such an analysis, the bladder 130 is analogous to the spring, while the fluid which is displaced through the openings is analogous to the mass. While optimization may be possible by considering the frequency of the source, the size of the bore hole 102 including diameter and depth, it is generally desirable to approximate the natural frequency so as to enable a given attenuator 122 for use in various situations including different source frequencies and different bore hole sizes. For example, in one embodiment, the attenuator may be designed with a natural frequency of approximately 600 Hertz (Hz)

It is noted that the housing 180 shown in FIGS. 4A and 4B is depicted as having closed ends. However, other embodiments may include a housing having either, or both ends, open to the bore hole fluid. In such a case, it is desirable to account for the area of the open ends when designing the number and size of openings 182 so as to maintain the area of exposure the bladder experiences to the bore hole fluid substantially equal with the cross-sectional area of the bore hole 102.

Referring more particularly to FIG. 4B, the bladder 130 is configured such that it does not consume the entirety of the cross-sectional area of the bore hole 102. Rather, it is desirable to keep the bladder 130 from touching the walls of the bore hole 102 and, when a housing 180 is utilized, it may be desirable to keep the bladder 130 from substantial contact with the walls of the housing 180. However, within physical constraints, the larger the bladder, the more attenuation which may be effected thereby.

In one embodiment, the bladder 130 may be sized such that its cross-sectional area is approximately one-half the cross-sectional area of the bore hole 102, both taken with respect to the longitudinal axis of the bore hole 102. Additionally, it may be desirable to size the length L of the bladder 130 based on the diameter D of the bore hole 102. Thus, for example, one embodiment may include a bladder 130 exhibiting a length L which is three times the distance of the bore hole diameter D. While determination of the length L determines, in part, the volume of the bladder 130 and, generally, it is desirable to increase the volume of the bladder 130, it may be desirable to match the length L of the bladder to within approximately one half of a wavelength of that of the expected tube wave.

As an exemplary embodiment only, the bladder 130 may be approximately 105 to 110 cubic inches ($in^3$) with the housing 180 being approximately ⅛ of an inch thick, and wherein the cumulative area of the openings 182 is approximately 15 square inches ($in^2$). However, other embodiments may have significantly different parameters depending on various factors related to its intended environment.

Additionally, it is desirable to maintain the bladder 130 in a substantially relaxed state. In other words, the bladder 130 should not be over-pressurized such that the bladder material is in tension. Over-pressurization of the bladder 130 keeps the bladder from absorbing energy of the tube waves and, instead, may reflect the tube wave back within the bore hole toward its origin. Thus, for example, it may be desirable to maintain the bladder 130 within approximately 0 to 1 psi, and perhaps more desirable to maintain the bladder 130 within approximately 0 to 0.33 psi of the hydrostatic pressure of the surrounding bore hole fluid. The soft, relaxed bladder 130, in conjunction with impedance matched housing member 180, enables the attenuator to be effective over a broad range of frequencies.

Referring back to FIGS. 1 and 2, as the attenuator 122 is caused to ascend within the bore hole 102, the surrounding hydrostatic pressure decreases causing the pressure within the bladder 130 to be higher than the hydrostatic pressure of the bore hole fluid surrounding it. When such a pressure differential occurs, the check valve 136 coupled with the bladder allows gas to bleed off and escape from the bladder 130 and into the bore hole 102 keeping the bladder 130 from over inflating. Thus, as the attenuator 122 traverses up and down the bore hole 102, the bladder 130 remains in a soft, relaxed state and maintains a substantially constant volume at a pressure which is within a defined range relative to the hydrostatic pressure of the immediate surrounding bore hole fluid.

Figure 5:
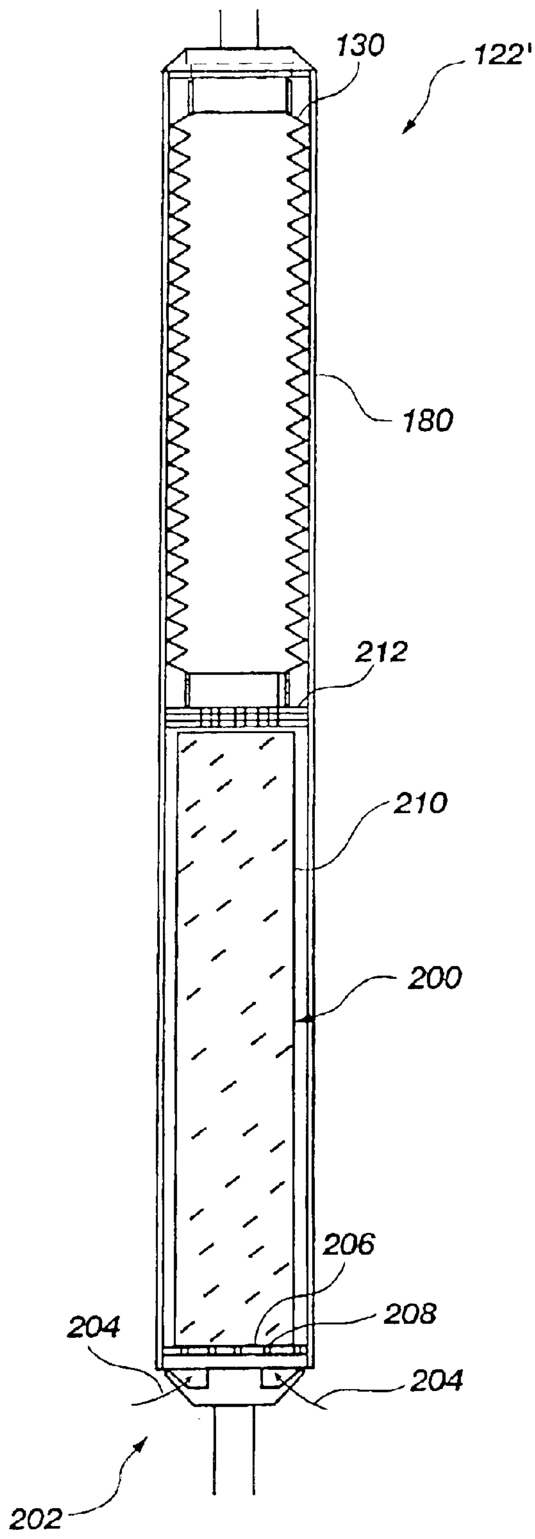
FIG. 5 is a partial cross-sectional view of an attenuating device according to another embodiment of the present invention.

Referring now to FIG. 5, an attenuator 122' is shown in accordance with another embodiment of the present invention. The attenuator 122' includes a bladder 130 disposed within a housing member 180 similar to the embodiments described above herein. However, the attenuator 122' does not include a pressure vessel 138 (FIG. 2) as with the previously described embodiments. Rather, a chamber 200, which may be an extension of the housing member 180 formed about the bladder 130, or may be a separately formed structure, is coupled with the lower end of the bladder 130. The lower end 202 of the chamber 200 is open to the bore hole fluid as indicated by directional arrows 204. A plate 206, having a plurality of openings 208 formed therein and which might be termed, for example, a screen, is disposed within the chamber 200 at or near its lower end 202. A volume of water-reactive material 210 such as, for example, alkaline or alkaline earth metals and their alloys, is disposed within the chamber 200 above the plate 206. The water-reactive material 210 may be a solid or a liquid and, while shown generally as a large bulk of material, may be present in other forms including, for example, as a plurality of premeasured packets of the water-reactive material 210, or nodules, rods, screens or other configurations of water-reactive material 210. It is desirable to use a volume of water-reactive material 210 within chamber 200 sufficient to generate gas to maintain bladder 130 in an inflated state down to the lowermost depth at which it will be deployed.

When the water-reactive material 210 comes in contact with the bore hole fluid it generates a volume of gas such as, for example, hydrogen. The volume of gas then travels upwardly through the chamber 200, through an opening in a header or plate 212 disposed between the chamber 200 and bladder 130. Thus, the bladder 130 as well as chamber 200 become filled with the gas generated from the water-reactive material 210.

Further, a small pocket of gas generated by the water-reactive material 210 through contact with the bore hole fluid extends below the plate 206 within the chamber's lower end 202, removing the water-reactive material 210 from substantial contact with bore hole fluid and terminating the gas-generating reaction. However, as the attenuator 122' is caused to descend within the bore hole 102 (FIG. 1), the hydrostatic pressure of the bore hole fluid, which increases with depth, forces the bore hole fluid to displace, or more appropriately, compress, the pocket of gas until the bore hole fluid again contacts the water-reactive material 210 thereby generating additional gas within the chamber 200. The process continues as the attenuator 122' descends within the bore hole 102 (FIG. 1) maintaining the bladder 130 at a substantially constant volume and in a soft, relaxed state. Of course, when attenuator 122' is caused to ascend within the bore hole 102, excess gas pressure will bleed off through openings 208 in header or plate 206.

The attenuator 122' presents several advantages inasmuch as there is no pressurization of any component outside the bore hole and thus does not require a pressure vessel. This eliminates numerous safety concerns and also allows the attenuator 122' to be fabricated as a much lighter, less complex structure providing various cost and operational advantages.

Figure 6:
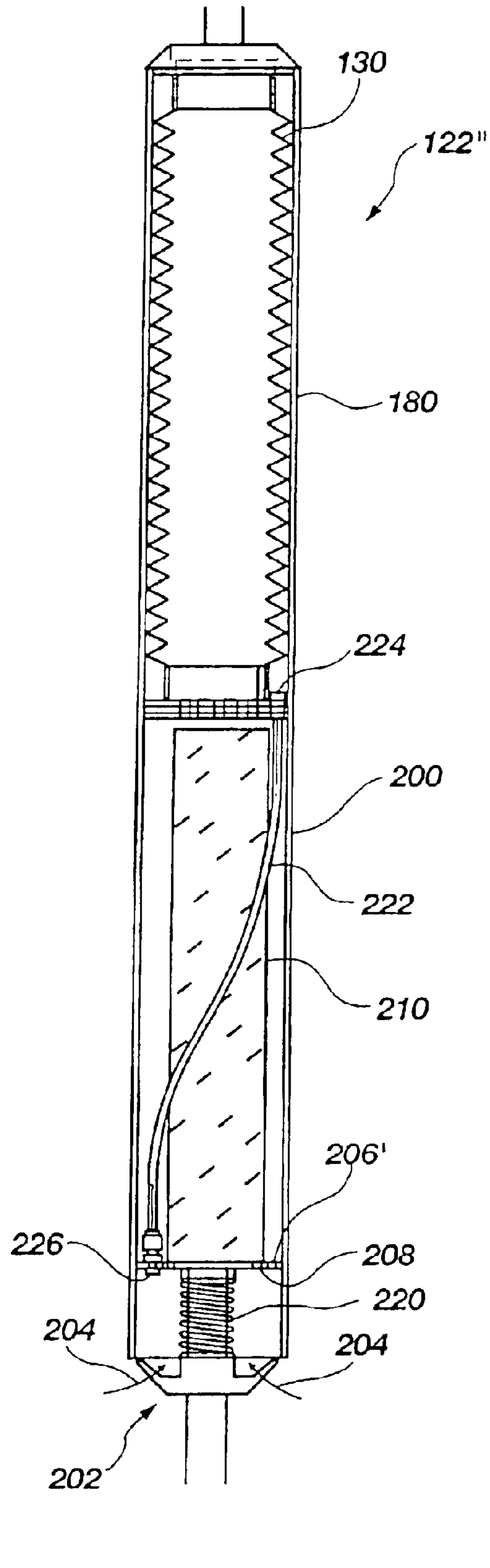
FIG. 6 is a partial cross-sectional view of an attenuating device according to yet another embodiment of the present invention.

Referring now to FIG. 6, an attenuator 122" is shown according to yet another embodiment of the present invention. The attenuator 122" is generally similar to that described with respect to FIG. 5 in that it utilizes a water-reactive material 210 to provide gas to maintain the bladder 130. However, in attenuator 122", the header or plate 206' is movable longitudinally within the chamber 200 and a biasing member 220 is used to bias the header or plate 206' upwardly against the volume of water-reactive material 210 to maintain contact therewith as it is consumed during gas generation. However, with the upward movement of the plate 206' within the chamber 200, a larger pocket of gas than is desired may be formed directly below the plate 206'. Thus, a fluid bypass line 222, having a first open end 224 exposed to the bore hole fluid at local hydrostatic pressure, may be directed to communicate with a second open end 226 proximate an area just below the plate 206' to provide an amount of bore hole fluid for balancing the system and keeping the bore hole fluid at a desired level within the chamber 200 adjacent the plate 206' and water-reactive material 210.

It is noted that while the attenuators of the present invention have been generally described as being deployed in a "target" or receiver bore hole (i.e., a bore hole having a seismic detector or receiver positioned therein), the attenuators of the present invention may be used in any bore hole wherein tube wave suppression is desirable, including, for example a source bore hole (i.e., the bore hole containing a seismic energy source) or even a bore hole having neither receivers or energy sources in mitigation of unwanted tube waves therein is desirable.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed:

1. An apparatus for attenuating tube waves within a bore hole comprising:

a bladder formed of a soft, compliant material;

a chamber having an upper end and lower end, the upper end of the chamber being in fluid communication with the bladder, the lower end having at least one opening therein providing fluid communication between an interior portion of the chamber and an exterior thereof; and a volume of water-reactive material capable of generating a gas responsive to contact with water stored within the chamber in communication with the at least one opening.

2. The apparatus of claim 1, wherein the water-reactive material includes at least one of an alkaline and an alkaline earth metal material.

3. The apparatus of claim 2, further comprising a housing disposed about the bladder, the housing having a plurality of openings formed therein.

4. The apparatus of claim 3, wherein a cumulative area of the plurality openings is substantially the same as a cross-sectional area of a bore hole in which the apparatus is to be disposed as taken substantially perpendicular to a longitudinal axis thereof.

5. The apparatus of claim 4, wherein the bladder exhibits a cross-sectional area which is approximately one-half of the cross-sectional area of the bore hole in which the apparatus is to be disposed.

6. The apparatus of claim 5, wherein the bladder is formed of a material comprising vinyl.

7. The apparatus of claim 1, further comprising a plate disposed within the chamber proximate the lower end of the chamber, the plate having the at least one opening formed therein, wherein the water-reactive material is disposed on a top surface of the plate.

8. The apparatus of claim 7, wherein the plate is moveably secured within the chamber.

9. The apparatus of claim 8, further comprising a biasing member configured to bias the plate upwardly relative to the lower end of the chamber.

10. The apparatus of claim 9, further comprising a fluid bypass line having a first open end located above at least a portion of the water-reactive material and extending to a second open end disposed within the chamber and adjacent the plate.

11. A method of attenuating tube waves within a bore hole containing a volume of fluid therein, the method comprising:

disposing a bladder within the volume of fluid;

coupling a chamber having a volume of water-reactive material disposed therein with the bladder such that an upper end of the chamber is in fluid communication with the bladder;

allowing a portion of the volume of fluid to enter the chamber;

reacting the portion of the volume of fluid with a portion of the volume of the water-reactive material to generate a volume of gas; and allowing at least a portion of the volume of gas to enter into the bladder.

12. The method according to claim 11, further comprising disposing the bladder within a housing having a plurality of openings formed therein.

13. The method according to claim 12, further comprising forming the plurality of openings such that a cumulative area of the plurality of openings is substantially equal with a cross-sectional area of the bore hole taken substantially perpendicular to a longitudinal axis of the bore hole.

14. The method according to claim 13, further comprising configuring the bladder to exhibit a cross-sectional area which is substantially one-half of the cross-sectional area of the bore hole.

15. The method according to claim 11, further comprising disposing a plate having at least one opening formed therein within the chamber, disposing the volume of water-reactive material on an upper surface of the plate, and biasing the plate toward the upper end of the chamber.

16. The method according to claim 15, further comprising providing a fluid bypass line including exposing a first open end of the fluid bypass line to a hydrostatic pressure of the volume of fluid in the bore hole above the water-reactive material and disposing a second open end of the fluid bypass line within the chamber adjacent the plate.

17. A system for surveying a subterranean formation comprising:

a seismic energy source configured to induce seismic waves in a subterranean formation;

at least one sensing apparatus configured for deployment within a bore hole; and an apparatus for attenuating tube waves within a bore hole, the attenuating apparatus comprising:

a bladder formed of a soft, compliant material;

a pressure vessel configured to store a volume of pressurized gas therein;

a pressure regulating system operatively coupled between the bladder and the pressure vessel, wherein the pressure regulating system is configured to admit gas from the pressure vessel into the bladder at a reduced pressure relative to gas pressure in the pressure vessel in response to an increase in a hydrostatic pressure of a fluid within a bore hole proximate the apparatus and wherein the regulating system is configured to maintain the bladder at a substantially balanced pressure relative to the hydrostatic pressure of fluid in a bore hole proximate the apparatus; and a valve operatively coupled with the pressure vessel and configured to admit a volume of bore hole fluid thereinto when the hydrostatic pressure of fluid within a bore hole proximate the apparatus is greater than a pressure of the volume of pressurized gas within the pressure vessel.

18. A system for surveying a subterranean formation comprising:

a seismic energy source configured to induce seismic waves in a subterranean formation;

at least one sensing apparatus configured for deployment within a bore hole; and an apparatus for attenuating tube waves within a bore hole, the attenuating apparatus comprising:

a bladder formed of a soft, compliant material;

a chamber having an upper end and lower end, the upper end of the chamber being in fluid communication with the bladder, the lower end having at least one opening therein providing fluid communication between an interior portion of the chamber and an exterior thereof;

a volume of water-reactive material capable of generating a gas responsive to contact with water stored within the chamber in communication with the at least one opening.

* * * * *